(12) United States Patent
Lemke et al.

(10) Patent No.: US 11,820,718 B2
(45) Date of Patent: Nov. 21, 2023

(54) OXYFUEL CLINKER PRODUCTION WITHOUT RECIRCULATION OF THE PREHEATER EXHAUST GASES

(71) Applicants: THYSSENKRUPP INDUSTRIAL SOLUTIONS AG, Essen (DE); VICAT SA, L'Isle d'Abeau (FR); DYCKERHOFF GMBH, Wiesbaden (DE)

(72) Inventors: Jost Lemke, Ennigerloh (DE); Eike Willms, Dortmund (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 590 days.

(21) Appl. No.: 17/051,477

(22) PCT Filed: Apr. 26, 2019

(86) PCT No.: PCT/EP2019/060765
§ 371 (c)(1),
(2) Date: Oct. 29, 2020

(87) PCT Pub. No.: WO2019/211196
PCT Pub. Date: Nov. 7, 2019

(65) Prior Publication Data
US 2021/0238091 A1    Aug. 5, 2021

(30) Foreign Application Priority Data
Apr. 30, 2018    (DE) .................... 10 2018 206 674.4

(51) Int. Cl.
| | | |
|---|---|---|
| C04B 7/45 | (2006.01) | |
| C04B 2/10 | (2006.01) | |
| C04B 7/43 | (2006.01) | |
| F27B 7/20 | (2006.01) | |
| F27D 17/00 | (2006.01) | |

(52) U.S. Cl.
CPC .................. C04B 7/45 (2013.01); C04B 2/10 (2013.01); C04B 7/434 (2013.01); F27B 7/2033 (2013.01); F27D 17/008 (2013.01)

(58) Field of Classification Search
CPC ... C04B 7/45; C04B 2/10; C04B 7/434; F27B 7/2033; F27B 7/2041; F27B 19/04; F27B 7/2025; F27D 17/008; Y02P 40/18
See application file for complete search history.

(56) References Cited

U.S. PATENT DOCUMENTS

| | | |
|---|---|---|
| 3,869,248 A | 3/1975 | Hirai et al. |
| 2015/0037745 A1 | 2/2015 | Kupper |
| 2017/0267582 A1 | 9/2017 | Panier |

FOREIGN PATENT DOCUMENTS

| | | |
|---|---|---|
| EP | 1 037 005 B | 4/2006 |
| EP | 1 923 367 A | 5/2008 |
| EP | 2 952 244 A | 12/2015 |
| JP | 2007-126328 A | 5/2007 |
| WO | 2010/046345 A | 4/2010 |
| WO | 2010/067223 A | 6/2010 |
| WO | 2011/001044 A | 1/2011 |

OTHER PUBLICATIONS

English Translation of International Search Report issued in PCT/EP2019/060765, dated May 21, 2019.

*Primary Examiner* — Anthony J Green
(74) *Attorney, Agent, or Firm* — thyssenkrupp North America, LLC (57) ABSTRACT

Processes and plants for producing cement clinker, wherein no recirculation of preheater exhaust gases occurs and the ratio of solid fed in to exhaust gas in the preheater is set to greater than 1.0 kg of solid to gas.

16 Claims, 5 Drawing Sheets

OXYFUEL CLINKER PRODUCTION WITHOUT RECIRCULATION OF THE PREHEATER EXHAUST GASES

CROSS REFERENCE TO RELATED APPLICATIONS

This application is a U.S. National Stage Entry of International Patent Application Serial Number PCT/EP2019/060765, filed Apr. 26, 2019, which claims priority to German Patent Application No. DE 10 2018 206 674.4, filed Apr. 30, 2018, the entire contents of both of which are incorporated herein by reference.

FIELD

The present disclosure generally relates to processes and plants for the production of cement clinker in which no recirculation of the preheater exhaust gases occurs.

BACKGROUND

The prior art discloses processes and plants in which air is introduced and preheated in the clinker cooler, with part of this air being able to flow into the furnace. Furthermore, it is known that mixtures of $CO_2$ and $O_2$ can be introduced instead of air into the cooler. To separate off carbon oxide, cement clinker is often to be burnt with exclusion of nitrogen. For this purpose, pure oxygen is then used instead of combustion air in the calciner region. The exhaust gas then consists mainly of $CO_2$ and water vapor and contains only little oxygen and nitrogen. This exhaust gas can be worked up comparatively simply to give pure $CO_2$. All available concepts for this purpose always provide for recirculation of preheater exhaust gases in order to bring about little change in the process temperatures and volume flows compared to the prior art.

Examples of prior art are EP 1 037 005 B1, JP 2007-126328 A or WO 2010/046345 A1, WO 2011/001044 A1, EP 1923367 A1, US 2017/0267582, WO 2010/067223 A1 or EP 2952244 A1.

Owing to continually increasing demands in term of economics and ecology, there is still a need for improved plants and processes for the production of cement clinker.

Thus a need exists for improved plants and processes for the production of cement clinker which do not have the disadvantages of the prior art or are improved in respect of economics and ecology compared to the plants and processes of the prior art and improve existing processes in such a way that exhaust gas recirculation can largely be dispensed with.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to processes and plants for the production of cement clinker in which no recirculation of the preheater exhaust gases occurs.

The present invention provides, in one embodiment, a rotary furnace plant for producing cement clinker, which comprises an apparatus for introducing oxygen-containing gas having a proportion of 15% by volume or less of nitrogen and a proportion of 50% by volume or more of oxygen into the calciner and optionally also into the rotary tube furnace.

In a further embodiment, the present invention correspondingly provides a process for producing cement clinker, wherein an oxygen-containing gas having a proportion of 15% by volume or less of nitrogen and a proportion of 50% by volume or more of oxygen is fed into the calciner and optionally also into the rotary tube furnace.

The plant of the invention and the process of the invention can thus be compared to a form of oxyfuel process.

In embodiments of the present invention, the rotary furnace plant consists of a cyclone preheater, an in-line calciner without tertiary air conduit, a rotary furnace and a cooler. A conduit for intermediate air runs from the cooler to an intermediate cyclone stage in the preheater and subsequently to the raw mill.

In some embodiments of the present invention, the cyclone preheater consists of a multistage cyclone cascade which is operated using a significantly smaller amount of gas. The exhaust gas volume flow downstream of the preheater is from about 0.50 to 0.70 standard $m^3$/kg of clinker. The ratio of amounts applied to exhaust gas can accordingly be higher than hitherto and in one variant is from 1 to 2 kg/kg of solid to gas, preferably from 1.3 to 1.9 kg/kg of solid to gas. In parallel to the cyclone cascade, at least one additional cyclone stage is provided, and both are supplied with hot air from the cooler. Based on the meal flow, these additional stages are, in a preferred embodiment, located centrally within the cyclone cascade.

In further embodiments of the present invention, the preheater can be configured as fluidized-bed reactor, especially in the form of what is known as a bubble-forming fluidized bed.

Accordingly, the ratio of introduced solid to exhaust gas in the preheating step is, according to the present invention, set to greater than 1.0 kg, preferably greater than 1.3 kg, of solid per 1 kg of gas, preferably from 1 to 2 kg/kg of solid to gas, particularly preferably from 1.3 to 1.9 kg/kg of solid to gas, or the plant is correspondingly configured for setting such a ratio (amounts applied to exhaust gas flow) in the preheater.

The calciner corresponds, in various embodiments, substantially to the classical design, with the solid-gas ratio being significantly higher; local solids loadings of more than 2 kg per kg of gas, for example from 2 to 8 kg per kg of gas, occur. In the calciner, the major part (more than 60%, for example, approximately 80%) of the heat of the fuel is converted. Despite an initial oxygen concentration of about 75%, the meal which is present provides a heat sink sufficient to prevent overheating. If coarse substitute fuel (with edge lengths of >100 mm) is to be burnt, an inclined region having a greater residence time for the fuel is optionally to be provided. Examples of such inclined regions are steps, pushing gratings, back-pushing gratings, etc.

In some embodiments of the present invention, the ratio of solid supplied to exhaust gas in the calcination step is accordingly set to greater than 1.0 kg, preferably greater than 1.3 kg, of solid per 1 kg of gas, preferably from 1 to 2 kg/kg of solid to gas, particularly preferably from 1.3 to 1.9 kg/kg of solid to gas, or the plant is correspondingly configured for setting such a ratio in the calciner.

One embodiment of the present invention relates to a process for producing hydraulic binder, preferably cement clinker, from at least one starting material, which consists of at least the steps of preheating of the starting material, calcination of the preheated starting material, firing of the calcined starting material with the objective of producing hydraulically active mineral phases, cooling of the hydraulic binder, characterized in that the total gas streams fed into the calciner consist to an extent of more than 50% by volume (preferably more than 85% by volume) of oxygen.

For the purposes of the present invention, it is possible to use conventional preheaters, i.e. preheaters which are configured as 1-train (or 1-stream) preheaters. Such preheaters usually have a plurality of stages.

In a preferred embodiment of the present invention, the 1-train preheaters used have 5 stages.

In preferred embodiments of the present invention, preheaters which are configured as 2-train (or 2-stream) preheaters are used.

In preferred embodiments of the present invention, these two-train preheaters have a plurality of stages, in particular 3, 4 or 5 stages. 4-Stage or 5-stage preheater cascades are most preferred here.

In the context of the present invention, the terms "-stream" and "-train" are used synonymously in connection with the preheaters.

The preheaters which are preferably used in one embodiment of the present invention are configured in a manner analogous to the PASEC process (parallel/sequential calciner). This means that, in a preferred embodiment of the present invention, one calciner and a plurality of preheater streams, usually one calciner and two preheater streams, are arranged in such a way that both the material and also the gas streams (in countercurrent) cross (two preheater streams cross but are arranged sequentially).

In further preferred embodiments of the present invention, integrated calciners are used. This means that a circulating calcium carbonate or calcium oxide stream is present. This embodiment is, in particular, implemented when the rotary furnace has an exhaust gas matrix having such low $CO_2$ concentrations that the equipment for separating of $CO_2$ would be particularly large and/or expensive.

A great advantage of the present invention is that the omission of exhaust gas recirculation makes it possible for the plant to be made smaller, which brings about tremendous advantages in terms of apparatus and money.

In various embodiments of the present invention, the introduction of gas is regulated with the objective of regulating the temperature in the calciner. In this way, the formation of NOx can be controlled. At the same time, it is also possible for the supply of gas to be regulated with the objective of regulating the amount of gas in the calciner; either as an alternative to or in addition to regulation of the temperature.

In preferred embodiments of the present invention, this regulated supply of gas is effected immediately downstream of the first separation cyclone. In other variants, the regulated supply of gas can, as an alternative to or in addition to the introduction after the first separation cyclone, be effected after a later or even the penultimate separator cyclone.

One embodiment of the present invention relates to a process for producing hydraulic cement clinker from at least one starting material, which consists of at least the steps of preheating of the starting material, calcination of the preheated starting material, firing of the calcined starting material with the objective of producing hydraulically active mineral phases, cooling of the hydraulic binder, characterized in that the preheating occurs in a cyclone preheater in which the ratio of solid supplied and exhaust gas is greater than from 1 to 2 kg of solid per 1 kg of gas, preferably from 1.3 to 1.9 kg of solid per kg of gas.

One embodiment of the present invention relates to a plant for producing hydraulic cement clinker, which consists of at least one cyclone preheater, an entrained flow calciner, a rotary furnace and a clinker cooler, characterized in that the entrained flow calciner has a nonvertical section in which coarse fuels having an edge length of more than 100 mm (i.e. nonentrainable size) are introduced and the hot gases in the calciner flow over them.

One embodiment of the present invention relates to a process for producing hydraulic cement clinker from at least one starting material, which consists of at least the steps of drying and milling of the raw material, preheating of the starting material, calcination of the preheated starting material, firing of the calcined starting material with the objective of producing hydraulically active mineral phases, cooling of the hydraulic binder, characterized in that hot air from the clinker cooler is at least partly fed to the preheating and subsequently the drying and milling, with mixing with the exhaust gas from the calcination and firing process being avoided.

In one embodiment of the present invention, the oxygen-containing gas is $N_2$-depleted air, in particular very highly $N_2$-depleted air.

In one embodiment of the present invention, the oxygen-containing gas is air which has been greatly enriched with $O_2$.

In one embodiment of the present invention, the oxygen-containing gas is pure (technical-grade) oxygen; this is a preferred embodiment of the present invention.

In one embodiment of the present invention, the oxygen-containing gas is not an $O_2/CO_2$ mixture.

In one embodiment of the present invention, the gas stream introduced is not recirculated gas.

In one embodiment of the present invention, the gas stream introduced does not contain any recirculated gas.

In one embodiment of the present invention, the oxygen-containing gas is not air or air which has been treated or worked up. This is a more preferred embodiment.

It should be taken into account that air may possibly be sucked in from the outside in small amounts due to operation of the plant under subatmospheric pressure. In this case, a small amount means less than 10% by volume, in particular from 1 to 5% by volume. This air which may possibly be sucked in from the outside is not taken into account in the definition of the oxygen-containing gas.

In the context of the present invention, the total amount of exhaust gas produced by combustion and calcination to form the binder (cement clinker) is, in some embodiments, from 0.50 to 0.70 standard m$^3$/kg of clinker. Here, one standard m$^3$ of gas corresponds to one m$^3$ of gas at a pressure of 101.325 kPa and a temperature of 273.15 K.

In the context of the present invention, it is possible to obtain $CO_2$ having a greatly increased purity downstream of the preheater, so that the further work-up is easier or more readily possible compared to the prior art.

In some embodiments of the present invention, a carbonator can be arranged in a preheater train. Such a carbonator is preferably used or operated only when exhaust gases exiting from the furnace, preferably rotary tube furnace, and introduced into the preheater train have an exhaust gas matrix which would make economic work-up of the $CO_2$ unnecessarily more expensive. Such an exhaust gas matrix is characterized by the exhaust gas having a content of less than 35% by volume of $CO_2$ in the dry reference state ("dry reference state" means that the moisture has been disregarded in the calculation of the exhaust gas).

In a first particular embodiment of the present invention, the process can be referred to as a process comprising a separate oxyfuel calciner with conventionally fired furnace.

Here, the plant for carrying out the process comprises a calciner for calcination of material which is firstly connected to a fuel store and, secondly, into which an oxygen-containing gas in the sense of the present invention, preferably pure oxygen, can be introduced. In this context, this calciner can thus be referred to as oxyfuel calciner. This calciner is connected to a first preheater for preheating material. The exhaust gases from this first preheater can be discharged for utilization of waste heat or exhaust gas treatment, and these exhaust gases can then be passed to $CO_2$ separation and $CO_2$ compression. From there, the gases are firstly conveyed to the stack and discharged into the atmosphere (residual gas) and secondly passed to $CO_2$ storage or to $CO_2$ transport or to further use.

The first preheater ("left-hand" preheater) is connected to a second preheater ("right-hand" preheater) and material, i.e. raw meal, is conveyed only in the direction of the second preheater, but not vice versa. Exhaust gas is also taken off from the second preheater and passed to further exhaust gas treatment. Hot exhaust gas originating from the rotary tube furnace is additionally fed to the second preheater.

Both the first preheater and the second preheater are connected to a raw meal silo, through which connection the raw meal is supplied to the two preheaters.

The material stream of raw meal going from the raw meal silo via the two preheaters and the calciner follows the flows known from the prior art. From the calciner, the raw meal is then introduced into the furnace, in particular a rotary tube furnace. Exhaust gases from this furnace can be fed into the second preheater.

The (rotary tube) furnace is provided in the usual way with a fuel store and a cooler for the clinker exiting from the furnace. The exhaust gas from the cooler can also be passed to waste heat utilization or exhaust gas treatment. The clinker leaving the cooler can then be fed into a clinker silo.

Figure 1:
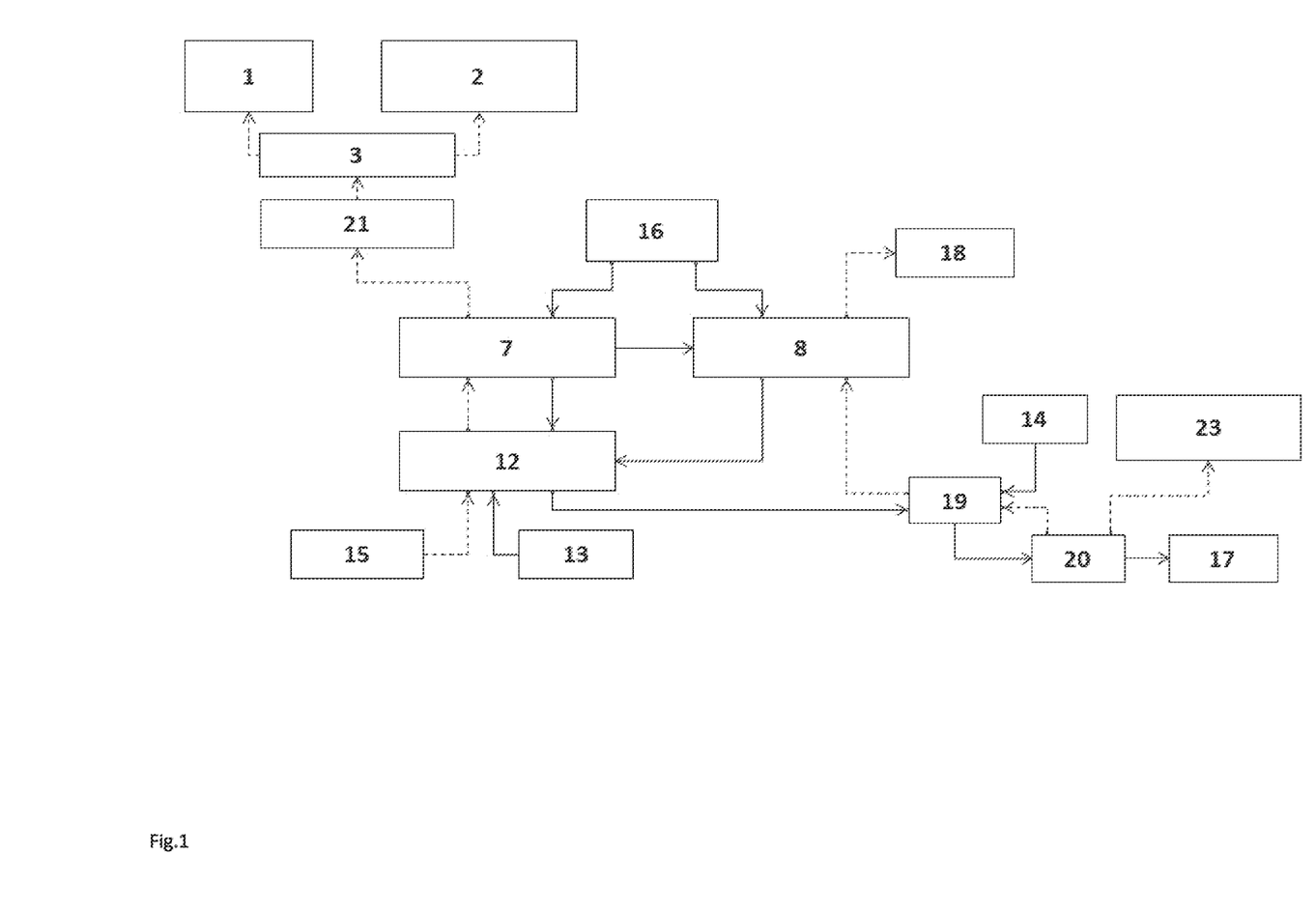
FIG. 1 is a flow chart of a process based on the oxyfuel technology.

Such a connection or such a process flow as just described is also depicted by way of example in FIG. 1.

A second particular embodiment of the present invention corresponds in large part to the first particular embodiment just described.

In this second particular embodiment, it is additionally provided for the oxygen-containing gas or the oxygen to be preheated before being fed into the oxyfuel calciner. Furthermore, the correspondingly preheated oxygen-containing gas or correspondingly preheated oxygen can in an embodiment of this kind also be concomitantly used in the waste heat utilization or exhaust gas treatment.

A further difference from the above-described first particular embodiment is the possibility of crossing of material streams analogous to the known PASEC process to occur between the first preheater ("left-hand" preheater) and the second preheater ("right-hand" preheater) in various variants. When the raw meal is supplied to the second preheater into which hot exhaust gas originating from the (rotary tube) furnace is additionally fed, the material can be dried and preheated in this second preheater. An advantage of this is that less energy is necessary for condensation of water in the $CO_2$ treatment.

Figure 2:
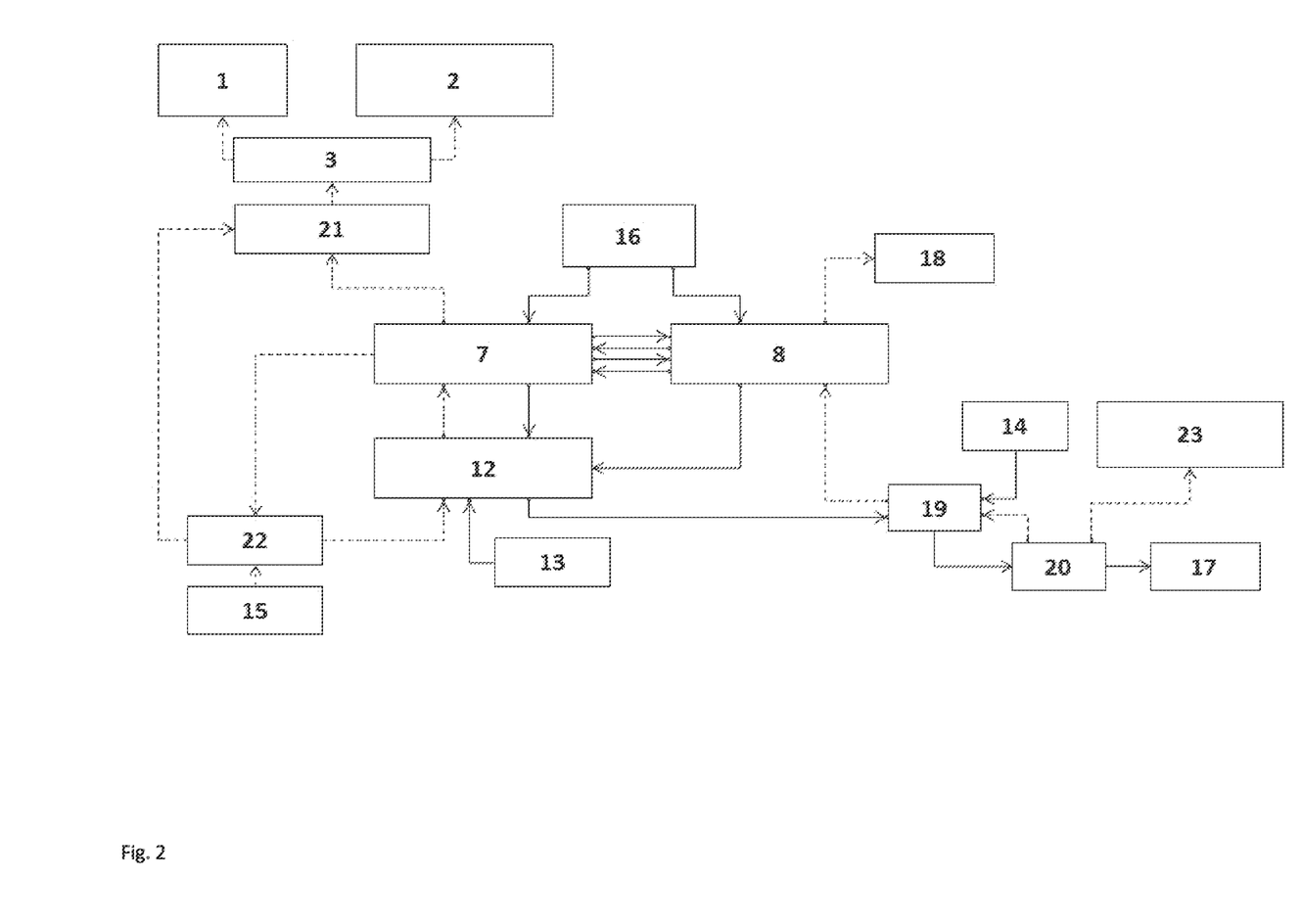
FIG. 2 is a flow chart of a process based on the oxyfuel technology.

Such a connection or such a process flow as just described is also depicted by way of example in FIG. 2.

In a third particular embodiment of the present invention, the process can be described as a process comprising a separate oxyfuel calciner with conventionally fired furnace and partial $CO_2$ depletion in the right-hand preheater stream (i.e. the preheater stream into which exhaust gas from the furnace, in particular rotary tube furnace, is introduced). In this embodiment, a cooler is present in the carbonator region which is located in the right-hand preheater stream; the carbonatization temperature is set by means of this cooler.

In this embodiment, too, the basic in-principle structure is known to a person skilled in the art. In contrast to the embodiment described first, a preheater stream consisting of a second preheater arranged at the top and a third preheater arranged at the bottom, between which a carbonator is arranged, is now arranged instead of a second preheater ("right-hand" preheater). In this embodiment, exchange of material takes place between the first preheater and the second preheater (in both directions) and also between the first preheater and the third preheater (likewise in both directions). In addition, the material leaving the oxyfuel calciner is divided into a part which is fed into the furnace, in particular rotary tube furnace, and a second part which is fed into the carbonator.

Figure 3:
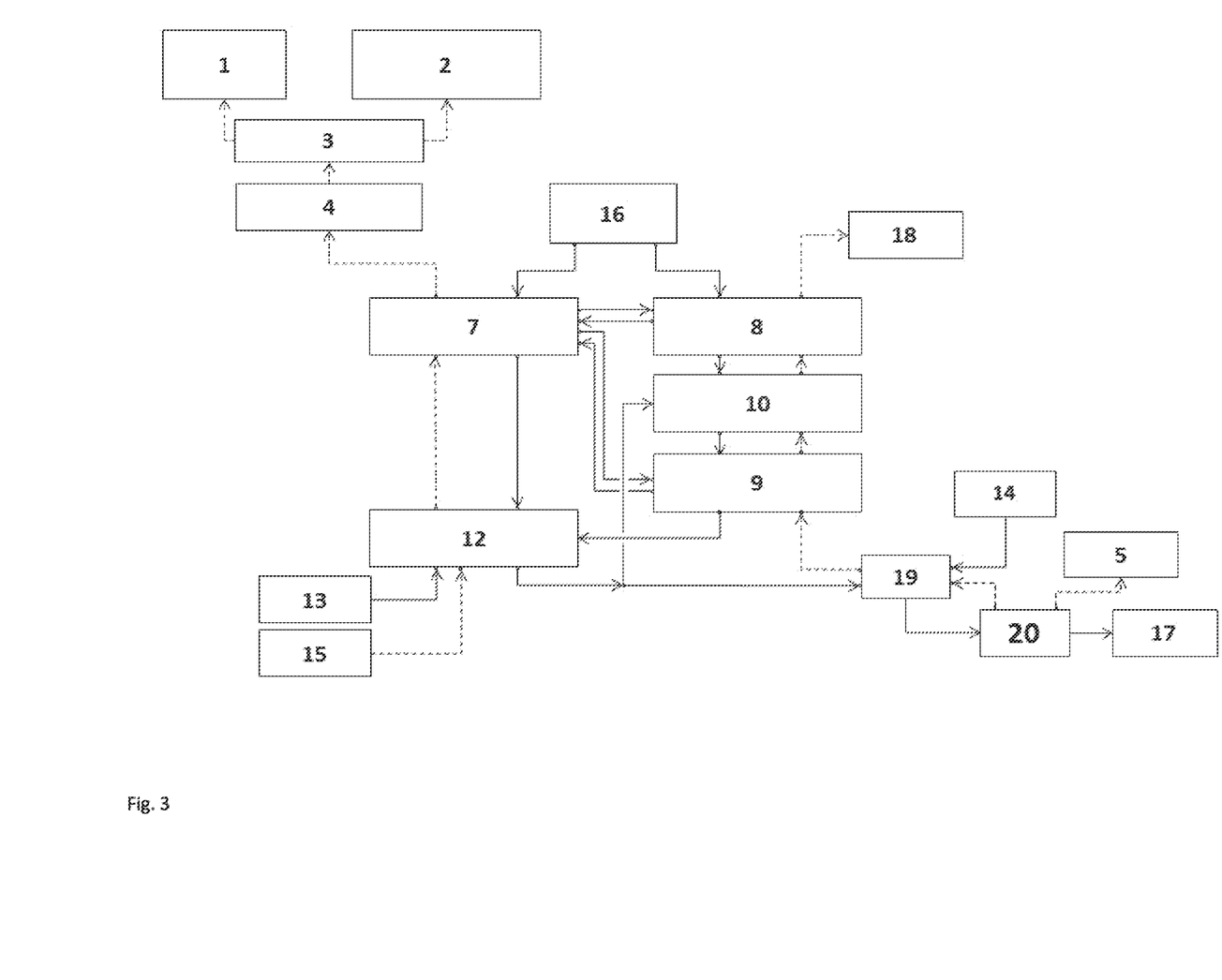
FIG. 3 is a flow chart of a process based on the oxyfuel technology.

Such a connection or such a process flow as just described is also depicted by way of example in FIG. 3.

In a fourth particular embodiment of the present invention, the process can be described as a process comprising a separate oxyfuel calciner with conventionally fired furnace and partial $CO_2$ depletion in the right-hand preheater stream (i.e. the preheater stream into which exhaust gas from the furnace, in particular rotary tube furnace, is fed). In this variant, no cooler for setting the carbonatization temperature is present in the carbonator region which is located in the right-hand preheater stream.

This embodiment differs from the above-described third particular embodiment in that introduction of material from the raw meal silo occurs only into the second preheater arranged at the top ("right-hand" preheater) but not into the first preheater. Exchange of material between the two preheater streams (first preheater on the one (left-hand) side and second preheater, carbonator and third preheater on the other (right-hand) side) occurs only from the third preheater arranged at the bottom to the first preheater.

Figure 4:
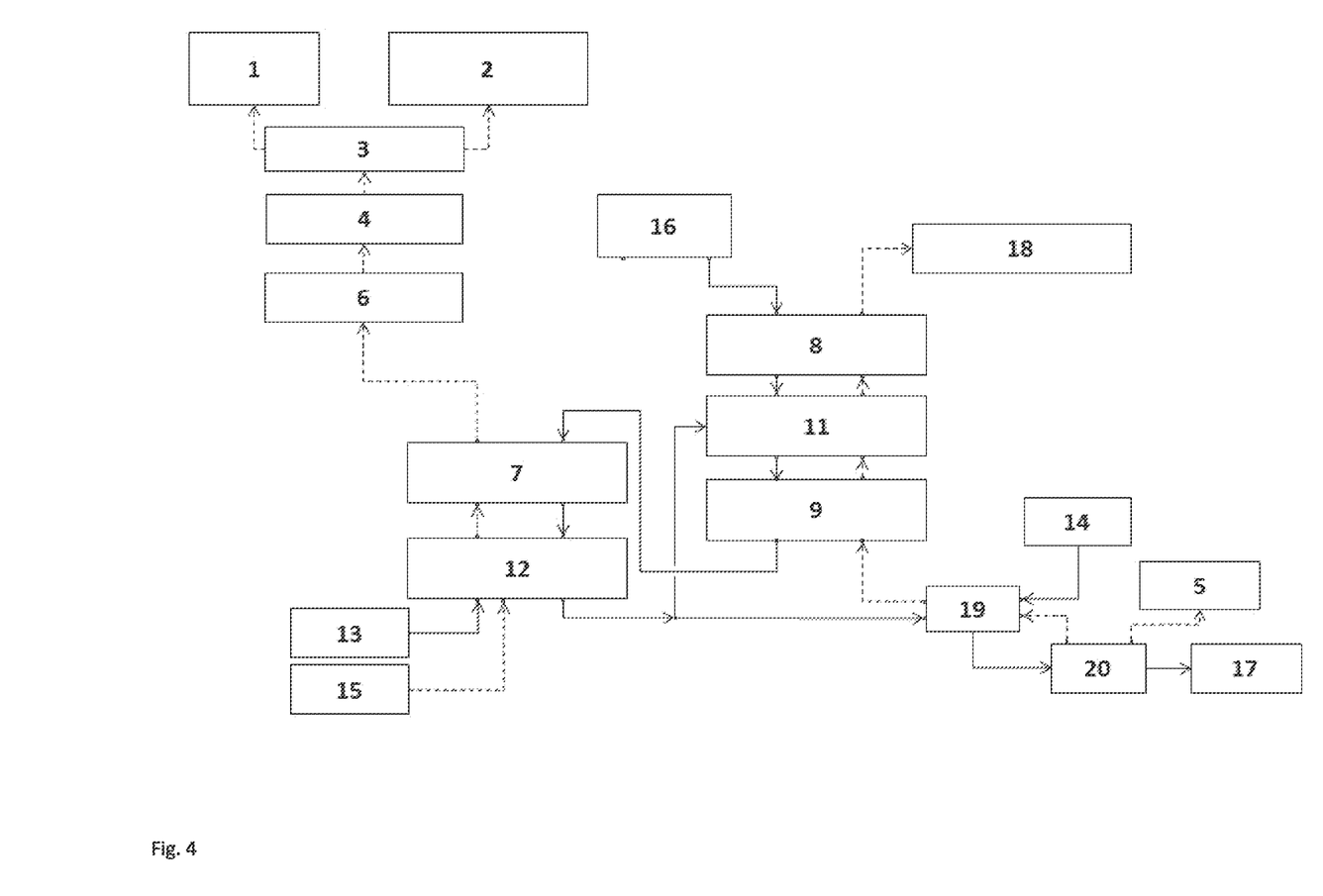
FIG. 4 is a flow chart of a process based on the oxyfuel technology.

Such a connection or such a process flow as just described is also depicted by way of example in FIG. 4.

It should be understood that the description of these four particular embodiments presented above does of course not set out all features which are implemented in reality but instead sets out the process and the plant structure in an accordingly simplified way, as can readily be deduced immediately by a person skilled in the art.

The present invention also provides, inter alia, the following embodiments designated by Roman numerals:

Embodiment I. Process for producing cement clinker, comprising the steps
a) preheating of the starting material to the calcination temperature,
b) calcination of the preheated starting material,
c) firing of the calcined starting material in a rotary furnace,
d) cooling of the cement clinker,
e) introduction of an oxygen-containing gas having a proportion of 15% by volume or less of nitrogen and a proportion of 50% by volume or more of oxygen into
i) the calciner,
characterized in that
no gases from the rotary furnace are fed to the calcination,
one-train or multitrain cyclone preheaters whose individual cyclones are connected to one another in a cascade-like manner are used for preheating,
material transfer and/or gas transfer is possible between the individual cyclone preheaters and
no recirculation of the preheater exhaust gases occurs.

Embodiment Ia. Process for producing cement clinker, comprising the steps
a) preheating of the starting material to the calcination temperature,
b) calcination of the preheated starting material,
c) firing of the calcined starting material in a rotary furnace,
d) cooling of the cement clinker,
e) introduction of an oxygen-containing gas having a proportion of 15% by volume or less of nitrogen and a proportion of 50% by volume or more of oxygen into
i) the calciner,
characterized in that
no gases from the rotary furnace are fed to the calcination,
one-train or multitrain cyclone preheaters whose individual cyclones are connected to one another in a cascade-like manner are used for preheating,
material transfer and/or gas transfer is possible between the individual cyclone preheaters and
no recirculation of the preheater exhaust gases occurs,
characterized in that the ratio of solid fed in to exhaust gas in step a) is set to greater than 1.0 kg of solid to gas.

Embodiment II. Process according to embodiment I or Ia, characterized in that step e) additionally comprises ii) the introduction of oxygen-containing gas into the rotary furnace.

Embodiment III. Process according to any of the preceding embodiments, characterized in that multistage one-train or multitrain cyclone preheaters are used.

Embodiment IV. Process according to any of the preceding embodiments, characterized in that two-train cyclone preheaters having from two to six stages, preferably five stages, are used.

Embodiment V. Process according to any of the preceding embodiments, characterized in that crossing of meal streams but no crossing of the gas streams occurs after each stage between the preheaters of a multitrain cyclone preheater.

Embodiment VI. Process according to any of the preceding embodiments, characterized in that preheating occurs with involvement of at least one carbonator.

Embodiment VII. Process according to any of the preceding embodiments, characterized in that a preheater having a carbonator of a second preheater train is supplied with exhaust gases coming from the rotary furnace, where the exhaust gases have a small proportion of $CO_2$ of less than 35% by volume in the dry reference state. In one variant, the exhaust gases are, as an alternative to or in addition to the low $CO_2$ content, characterized by a high proportion of incondensable constituents.

Embodiment VIII. Process according to either of embodiments VI and VII, characterized in that the carbonatization temperature is set by means of a carbonator having a cooler.

Embodiment IX. Process according to any of the preceding embodiments, characterized in that the ratio of solid fed in to exhaust gas in step a) is set to greater than 1.0 kg, preferably greater than 1.3 kg, of solid per 1 kg of gas, preferably from 1 to 2 kg/kg of solid to gas, particularly preferably from 1.3 to 1.9 kg/kg of solid to gas.

Embodiment X. Process according to any of the preceding embodiments, characterized in that the ratio of solid fed in to exhaust gas in step b) is set to greater than 1.0 kg, preferably greater than 1.3 kg, of solid per 1 kg of gas, preferably from 1 to 2 kg/kg of solid to gas, particularly preferably from 1.3 to 1.9 kg/kg of solid to gas, where the calciner is preferably an entrained flow calciner, or characterized in that the ratio of solid fed in to exhaust gas in step a) is set to greater than 1.3 kg of solid per 1 kg of gas, preferably from 1 to 2 kg/kg of solid to gas, particularly preferably from 1.3 to 1.9 kg/kg of solid to gas.

Embodiment XI. Process according to any of the preceding embodiments, characterized in that coarse fuels having an edge length of 70 mm or more, preferably 100 mm or more, are introduced into the calciner which is preferably an entrained flow calciner having a nonvertical section, so that the hot gases in the calciner flow over them.

Embodiment XII. Process according to any of the preceding embodiments, characterized in that the gas
i) contains 75% by volume or more of oxygen, preferably 85% by volume or more, 90% by volume or more, 95% by volume or more, 98% by volume or more or 99% by volume or more,
or
ii) contains 10% by volume or less of nitrogen, preferably 8% by volume or less, 6% by volume or less, 4% by volume or less, or has a nitrogen content below the detection limit,
or
iii) contains 75% by volume or more of oxygen, preferably 85% by volume or more, 90% by volume or more, 95% by volume or more, 98% by volume or more or 99% by volume or more, and 10% by volume or less of nitrogen, preferably 8% by volume or less, 6% by volume or less, 4% by volume or less, or has a nitrogen content below the detection limit.

Embodiment XIII. Process according to any of the preceding embodiments, characterized in that
a) the temperature in the calciner or
b) the amount of gas in the calciner or
c) the temperature and the amount of gas in the calciner
is/are regulated by partial recirculation of gases, where the recirculated gases are exhaust gases from one of the preheater stages following the calciner, preferably the first preheater stage following the calciner.

Embodiment XIV. Process according to embodiment XIII, characterized in that the introduction of the recirculated gases is carried out
    downstream of the first separation cyclone or
    between the first and penultimate separation cyclones or
    downstream of a plurality of separation cyclones.

Embodiment XV. Process according to any of embodiments I to VIII, characterized in that the amounts of oxygen-containing gas and fuel fed in to the calciner are regulated as a function of the calcination temperature and temperature in the preheater.

Embodiment XVI. Process according to any of the preceding embodiments, characterized in that recirculation of the calciner exhaust gases, in particular downstream of the lowermost cyclone stage, is additionally carried out.

Embodiment XVII. Plant for producing cement clinker, comprising a preheater, a calciner, a rotary furnace and a clinker cooler, where the plant has an apparatus for feeding gas into i) the calciner, where the gas fed in has a proportion of 15% by volume or less of nitrogen and a proportion of 50% by volume or more of oxygen, characterized in that
    no air from the rotary furnace is fed into the calciner,
    cyclone preheaters whose individual cyclones are connected to one another in a cascade-like manner are used as preheaters and
    material transfer and/or gas transfer is possible between the individual cyclone preheaters and
    no recirculation apparatus for the preheater exhaust gases is present.

Embodiment XVIIa. Plant for producing cement clinker, comprising a preheater, a calciner, a rotary furnace and a clinker cooler, where the plant has an apparatus for feeding gas into i) the calciner, where the gas fed in has a proportion of 15% by volume or less of nitrogen and a proportion of 50% by volume or more of oxygen, characterized in that
    no air from the rotary furnace is fed into the calciner,
    cyclone preheaters whose individual cyclones are connected to one another in a cascade-like manner are used as preheaters and
    material transfer and/or gas transfer is possible between the individual cyclone preheaters and
    no recirculation apparatus for the preheater exhaust gases is present, and
characterized in that the plant is configured for setting the ratio of solid fed in to exhaust gas in the preheater to greater than 1.0 kg of solid to gas.

Embodiment XVIII. Plant according to embodiment XVIIa, characterized in that the plant is configured for setting the ratio of solid fed in to exhaust gas in the preheater to greater than 1.3 kg of solid per 1 kg of gas, preferably from 1 to 2 kg/kg of solid to gas, particularly preferably from 1.3 to 1.9 kg/kg of solid to gas.

Embodiment XIX. Plant according to any of embodiments XVII, XVIIa and XVIII, characterized in that it additionally has ii) an apparatus for feeding oxygen-containing gas into the rotary furnace.

Although the present invention has been described in relation to conventionally fired furnaces, it can also be combined with the specific subject matter of the parallel invention "Oxyfuel clinker production with special oxygen addition", in particular the embodiments of the parallel invention designated by the Roman numerals CI to CVIII, where these combinations are expressly also subject matter of the present invention:

Embodiment CI. Process for producing cement clinker, comprising the steps
    a) preheating of the starting material to calcination temperature,
    b) calcination of the preheated starting material,
    c) firing of the calcined starting material in a furnace,
    d) cooling of the cement clinker,
    characterized by the step
    e) introduction of an oxygen-containing gas having a proportion of 15% by volume or less of nitrogen and a proportion of 50% by volume or more of oxygen from a first section of the cooler in the rotary furnace directly adjoining the top of the furnace.

Embodiment CIa. Process for producing for producing cement clinker, comprising the steps
    a) preheating of the starting material to calcination temperature,
    b) calcination of the preheated starting material,
    c) firing of the calcined starting material in a furnace,
    d) cooling of the cement clinker,
    e) introduction of an oxygen-containing gas having a proportion of 15% by volume or less of nitrogen and a proportion of 50% by volume or more of oxygen from a first section of the cooler in the rotary furnace directly adjoining the top of the furnace, characterized in that the total gas streams fed into the combustion processes consist to an extent of more than 50% by volume, preferably more than 85% by volume of oxygen.

Embodiment CII. Process according to embodiments CI and CIa, characterized in that a gas substream from plant parts located upstream in the material flow direction, preferably from the furnace inlet or downstream of the calciner, is recirculated to the top of the furnace for combustion.

Embodiment CIII. Process according to any of embodiments CI, CIa and CII, characterized in that hot exhaust air from the clinker cooler is at least partly fed to preheating, or at least partly to drying and milling, or at least partly to preheating and subsequently to drying and milling, with mixing with the exhaust gas from the calcination process and firing process being avoided.

Embodiment CIV. Process according to any of embodiments CI to CIII, characterized in that the oxygen-rich gas taken off from the furnace inlet region is, after depletion of at least sulfur and chlorine, recirculated to the furnace system.

Embodiment CV. Process according to any of embodiments CI to CIV, characterized in that the amount of gas and fuel fed in are regulated as a function of combustion temperature and gas volume flows.

Embodiment CVI. Process according to any of embodiments CI to CV, characterized in that the introduction of the oxygen-containing gas is set so that an excess of oxygen is present at the main burner and residual amounts of the oxygen go into the calciner for combustion there.

Embodiment CVII. Process according to any of embodiments CI to CVI, characterized in that the introduction of the oxygen-containing gas occurs exclusively on the side of a gas separation device which is arranged in the cooler and directly adjoins the top of the furnace, where the gas separation device is a mechanical gas separation device, a system based on barrier gas introduction or a combined system.

Embodiment CVIII. Plant for producing cement clinker, comprising a preheater, a calciner, a rotary furnace and a clinker cooler, characterized in that the plant has, in the section of the cooler directly adjoining the top of the furnace, an apparatus for feeding gas from the cooler into the rotary furnace, which apparatus is configured for feeding in a gas having a proportion of 15% by volume or less of nitrogen and a proportion of 50% by volume or more of oxygen.

Embodiment CVIIIa. Plant for producing cement clinker, comprising a preheater, a calciner, a rotary furnace and a clinker cooler, characterized in that the plant has, in the section of the cooler directly adjoining the top of the furnace, an apparatus for feeding gas from the cooler into the rotary furnace, which apparatus is configured for feeding in a gas having a proportion of 15% by volume or less of nitrogen and a proportion of 50% by volume or more of oxygen, and wherein the plant is configured for feeding gas streams which in total consist to an extent of more than 50% by volume, preferably more than 85% by volume, of oxygen into the combustion processes.

In specific embodiments of the present invention, no air from the rotary furnace is fed into the calciner. In other specific embodiments of the present invention, the first and second (and optionally further) preheaters or preheater streams are not independent of one another. These specific embodiments can explicitly be combined with the other abovementioned embodiments, especially the embodiments designated by I to XVIII.

The advantageous nature of the present invention arises, inter alia, from the following aspects: since furnace and preheater are always designed according to the amount of gas, the advantage of the omission of nitrogen from the mixture is that new plants can be built significantly smaller and therefore considerably more cheaply, or existing plants can be operated with a significantly higher capacity after having been converted.

An advantageous aspect of the present invention arises from the introduction of an oxygen-containing gas having a high oxygen content or pure oxygen into the calciner and the fact that there is no recirculation of the preheater gases (carrier gases) derived therefrom and accordingly the amounts of gas in the calciner and downstream preheater are significantly reduced.

This allows considerably smaller dimensioning of the calciner and of the downstream preheater/preheaters. This reduction in the size of the plant is accompanied by a reduction in the surface areas which give off heat to the surroundings. This firstly reduces the heat losses of the equipment but also the amount of unwanted air which specifically enters and thus increases the thermal energy efficiency of the plant. Furthermore, considerable savings are achieved in the electric energy consumption required as a result of the considerable reduction in the gas stream to be conveyed.

The reduction in the amount of gas automatically leads to an increase in the solids loading in the gas phase (cf. above), with this fact having to be taken into account both in the calciner and also in the riser conduits of the preheater cyclone. Here, gas velocities which ensure sufficient transport of the particles (raw meal particles) in the gas phase are provided. With decreasing diameter of the conduits, the Froude number, which is an important indicator of the capability of the gas phase to transport solid, increases. At large conduit diameters, the gas velocity can additionally be increased at high solids loadings in order to ensure the carrying capacity of the gas phase for the solid. As an alternative, it is possible, in the context of the present invention, to implement a plurality of systems connected in parallel (in order to reduce the tube diameter) or implement a partial recirculation of gases, in particular in the calciner region. Partial, controlled or regulated recirculation of calciner exhaust gas (downstream of cyclone separator) can be particularly advantageous in order to reduce temperature peaks and thus reduce pollutant emissions, e.g. thermal NOx (the nitrogen originates from the fuel) or equalize the combustion of fuels having a fluctuating calorific value.

In principle, a global increase in the velocity can, if desired, be set and optionally be coupled with internals which bring about a local increase in the velocity and/or locally effective dispersion of the solid.

Although the present invention is presented without flue gas circulation, it is possible, in various variants of the present invention, to combine the inventive measures with (internal) flue gas circulation.

In the figures, broken lines (arrows) denote gas transfer and solid lines (arrows) denote material transfer or mass transfer.

FIG. 1 shows a flow chart of a process based on the oxyfuel technology, in which hot gas exiting from the furnace is fed into preheater 2 which also receives material from preheater 1.

FIG. 2 shows a flow chart of a process based on the oxyfuel technology, in which hot exhaust air from the furnace is fed into preheater 2, in a manner similar to FIG. 1. However, in contrast to FIG. 1, exchange of material takes place between preheater 1 and preheater 2. In particular, crossing of material streams analogous to the PASEC process takes place there. Although it is in principle equally possible to convey the furnace exhaust gases into preheater 1, introduction into preheater 2 has the advantage that drying can then be carried out at right, i.e. less energy is required for condensation of water in the $CO_2$ treatment.

FIG. 3 shows a flow chart of a process based on the oxyfuel technology, in which the hot exhaust gases from the combustion furnace are supplied to the preheater 3 and then flow further through the carbonator to the preheater 2. In this way, a partial depletion of $CO_2$ in the right-hand stream is achieved. In addition, a cooler is arranged in the carbonator region in the right-hand stream.

FIG. 4 shows a flow chart of a process based on the oxyfuel technology, in which the procedure is similar to the process shown in FIG. 3, but, in contrast thereto, no cooler is present in the carbonator region.

Figure 5:
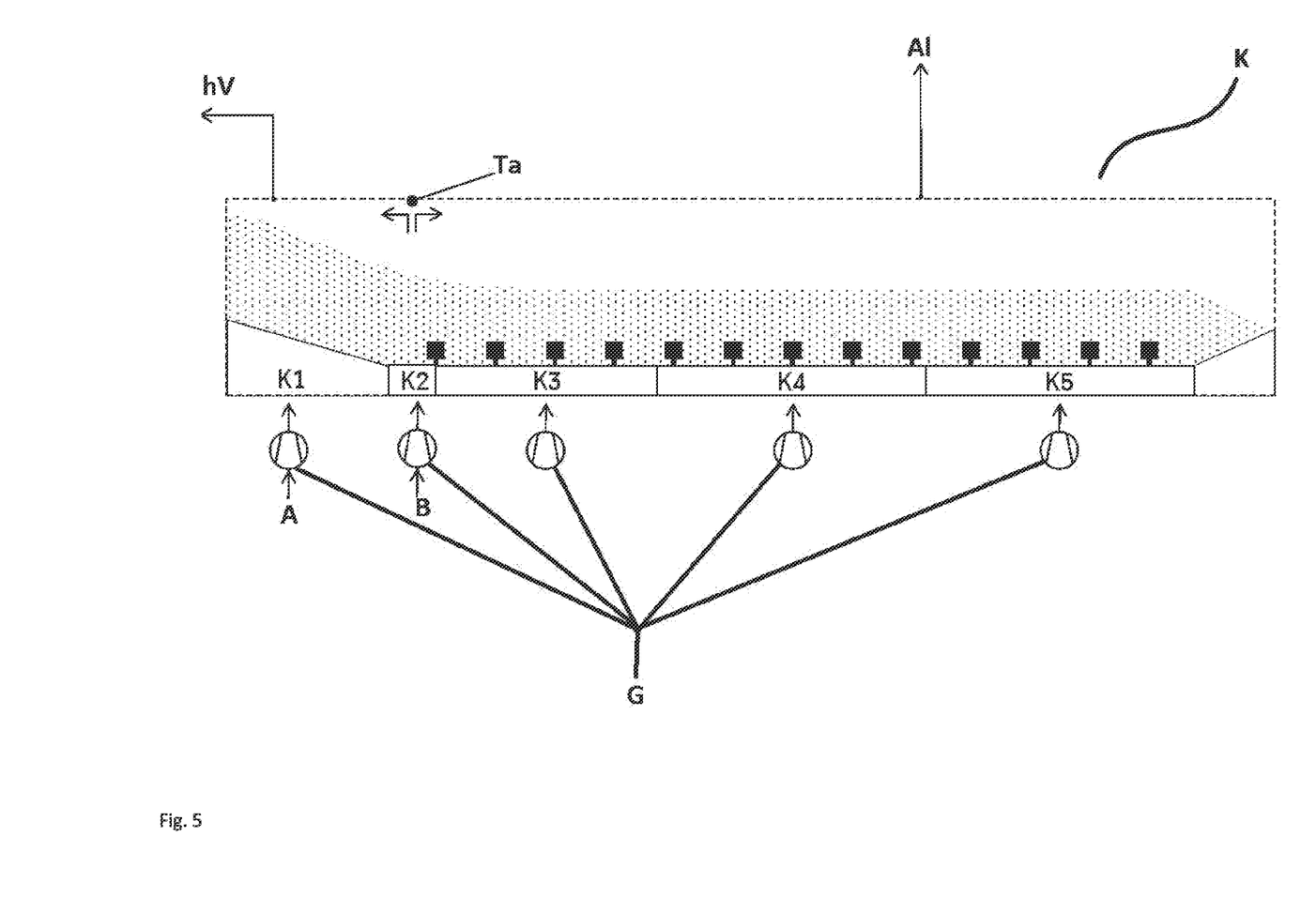
FIG. 5 is an apparatus in which an oxygen-containing gas is fed into the rotary furnace.

FIG. 5 shows an apparatus in which an oxygen-containing gas is fed into the rotary furnace; this apparatus can be combined with the present invention. FIG. 5 illustratively shows a cooler (clinker cooler) K which is divided into five different cooling zones K1 to K5. Here, gas is introduced appropriately via the various blowers G. The blowers G assigned to the zones K3 to K5 feed in cooling air for the clinker, but no combustion air into the furnace. The blower assigned to zone K1 feeds in the oxygen-containing gas A which is introduced as combustion air into the furnace. The blower assigned to the zone K2 supplies barrier gas B. This barrier gas can, for example, consist to an extent of 85 percent by volume or more of carbon oxide, with the balance being inert gas, or, for example, consist to an extent of 85 percent by volume or more of oxygen, with the balance being inert gas. The term inert gas here preferably refers to components such as water vapor, argon, etc. In both cases, the gas B serves as barrier gas for sealing off the oxygen region from the air region of the cooler. Furthermore, a $CO_2$ divider Ta is depicted in FIG. 1: this functions as a result of the introduction of the barrier gas or is configured in the form of a mechanical gas divider.

LIST OF REFERENCE SYMBOLS

K Cooler (clinker cooler)
Ta Gas separation device with barrier gas ($CO_2$ divider (barrier gas)) or mechanical gas separation device or mechanical gas separation device in combination with barrier gas ($CO_2$ divider (mechanical or combination of mechanical/barrier gas))
G Blower
K1 Cooling zone 1 (first cooling zone)
K2 Cooling zone 2 (second cooling zone)
K3 Cooling zone 3 (third cooling zone)
K4 Cooling zone 4 (fourth cooling zone)
K5 Cooling zone 5 (fifth cooling zone)
A Oxygen-containing gas
B Barrier gas
hV Hot combustion air
Al Exhaust air
1 Stack/atmosphere (residual gas)
2 $CO_2$ transport/storage/further use
3 $CO_2$ removal and compression
4 Exhaust gas treatment (from preheaters)
5 Exhaust gas treatment (from cooler)
6 Waste heat utilization/conversion into electric power
7 Preheater 1 (preheating of material)
8 Preheater 2 (preheating of material)
9 Preheater 3 (preheating of material)
10 Carbonator (with cooling)
11 Carbonator (without cooling)
12 Oxyfuel calciner (calcination of material)
13 Fuel store (for calciner)
14 Fuel store (for furnace)
15 Oxygen-containing gas/oxygen
16 Raw meal silo
17 Clinker silo
18 Heat utilization/exhaust gas treatment (from preheater 2)
19 Furnace (rotary tube furnace)
20 Cooler (clinker cooler)
21 Waste heat utilization/exhaust gas treatment (from preheater 1 or preheater 1 and preheating of oxygen-containing gas/oxygen)
22 Preheating of oxygen-containing gas/oxygen
23 Waste heat utilization/exhaust gas treatment (from cooler (clinker cooler))

What is claimed is:

1. A process for producing cement clinker, comprising:
preheating of a starting material to a calcination temperature,
performing calcination of the preheated starting material in a calciner,
firing of the calcined starting material in a rotary furnace to produce cement clinker, cooling of the cement clinker,
introducing an oxygen-containing gas having a proportion of 15% by volume or less of nitrogen and a proportion of 50% by volume or more of oxygen into the calciner,
wherein no gases from the rotary furnace are fed to the calciner,
providing at least a first and a second cyclone preheater configured for preheating and connected to one another in a cascading manner,
material transfer means and/or gas transfer means for transferring material between the cyclone preheaters, wherein material is conveyed only in a direction of the second cyclone preheater and
wherein recirculation of preheater exhaust gases does not occur, and
wherein a ratio of starting material fed in relative to exhaust gas in said preheating step is set to greater than 1.3 kg of starting material to 1.0 kg of exhaust gas,
passing exhaust gas from the first cyclone preheater for $CO_2$ separation and $CO_2$ compression,
conveying residual gases to a stack for discharge into the atmosphere,
passing separated $CO_2$ for $CO_2$ storage, $CO_2$ transport, or further $CO_2$ utilization,
feeding hot exhaust gas from the rotary furnace to the second cyclone preheater.

2. The process of claim 1 further comprising introducing oxygen-containing gas into the rotary furnace.

3. The process of claim 1 wherein the cyclone preheaters are multistage one-train or multitrain cyclone preheaters.

4. The process of claim 1 wherein the cyclone preheaters are two-train cyclone preheaters having from two to six stages.

5. The process of claim 1 wherein crossing of meal streams but no crossing of the gas streams occurs after each stage between the cyclone preheaters of a multitrain cyclone preheater.

6. The process of claim 1 wherein preheating occurs with involvement of at least one carbonator.

7. The process of claim 1 wherein a cyclone preheater having a carbonator of a second preheater train is supplied with exhaust gases coming from the rotary furnace, where the exhaust gases have a proportion of $CO_2$ of less than 35% in the dry reference state.

8. The process of claim 6 wherein a carbonatization temperature is set via the carbonator having a cooler.

9. The process of claim 1 wherein the ratio of solid material fed in relative to exhaust gas in said calcination step is set to greater than 1.0 kg of solid material to exhaust gas.

10. The process of claim 1 wherein coarse fuels having an edge length of 70 mm or more, preferably 100 mm or more, are introduced into the calcinerm wherein the calciner is an entrained flow calciner having a nonvertical section, such that the hot gases in the calciner flow over the coarse fuels.

11. The process of claim 1 wherein the oxygen-containing gas contains 75% by volume or more of oxygen or contains 10% by volume or less of nitrogen or contains 75% by volume or more of oxygen and 10% by volume or less of nitrogen.

12. The process of claim 1 wherein the amounts of oxygen-containing gas and fuel fed in to the calciner are regulated as a function of the calcination temperature and temperature in the preheater.

13. The process of claim 1 further comprising recirculating the calciner exhaust gases.

14. A plant for producing cement clinker, comprising:
a preheater,
a calciner,
a rotary furnace,
a clinker cooler,
an apparatus for feeding gas into the calciner,
wherein oxygen-containing gas fed in has a proportion of 15% by volume or less of nitrogen and a proportion of 50% by volume or more of oxygen,
wherein no air from the rotary furnace is fed into the calciner,
cyclone preheaters connected to one another in a cascading manner comprising at least a first preheater and a second preheater, and means for material transfer and/or gas transfer between the cyclone preheaters, and the plant is free of a recirculation apparatus for preheater exhaust gases, wherein the plant is configured to set the ratio of solid material fed in relative to exhaust gas in the cyclone preheaters to a ratio of greater than 1.0 kg of solid material to exhaust gas.

15. The plant of claim 14 wherein the plant is configured for setting the ratio of solid fed in relative to exhaust gas in the cyclone preheaters to a ratio greater than 1.3 kg of solid material per 1 kg of exhaust gas.

16. The plant of claim 14 further comprising an apparatus for feeding oxygen-containing gas into the rotary furnace.

* * * * *

UNITED STATES PATENT AND TRADEMARK OFFICE
CERTIFICATE OF CORRECTION

Page 1 of 1

PATENT NO. : 11,820,718 B2
APPLICATION NO. : 17/051477
DATED : November 21, 2023
INVENTOR(S) : Jost Lemke and Eike Willms It is certified that error appears in the above-identified patent and that said Letters Patent is hereby corrected as shown below:

On the Title Page

In item (73) "Assignee" should appear as:
(73) Assignees: THYSSENKRUPP INDUSTRIAL SOLUTIONS AG, Essen (DE); VICAT SA, L'Isle d'Abeau (FR); DYCKERHOFF GMBH, Wiesbaden (DE)

Signed and Sealed this
Eleventh Day of February, 2025

Coke Morgan Stewart
*Acting Director of the United States Patent and Trademark Office*